United States Patent [19]
Kaku et al.

[11] Patent Number: 6,021,160
[45] Date of Patent: Feb. 1, 2000

[54] TRAINING METHOD FOR NON-NYQUIST TRANSMISSION SYSTEM AND TRAINING DATA TRANSMISSION APPARATUS FOR NON-NYQUIST TRANSMISSION SYSTEM

[75] Inventors: Takashi Kaku; Noboru Kawada; Yuri Nigaki, all of Kawasaki, Japan

[73] Assignee: Fujitsu Limited, Kawasaki, Japan

[21] Appl. No.: 08/539,067

[22] Filed: Oct. 4, 1995

[30] Foreign Application Priority Data

Dec. 20, 1994 [JP] Japan .................................. 6-317334

[51] Int. Cl.$^7$ .................................................. H03H 7/30
[52] U.S. Cl. ......................... 375/231; 375/280; 375/368
[58] Field of Search .................................. 375/225, 208,
375/210, 365, 324, 329, 340, 343, 231,
230, 229, 259, 271, 279, 280, 281, 282,
295, 302, 308, 368; 364/724.11, 724.2,
728.03, 724.19; 333/28 R

[56] References Cited

U.S. PATENT DOCUMENTS

| | | | |
|---|---|---|---|
| 4,868,850 | 9/1989 | Kaku et al. ............................... | 375/13 |
| 5,199,047 | 3/1993 | Koch ......................................... | 375/13 |
| 5,260,972 | 11/1993 | Wang ........................................ | 375/58 |
| 5,454,007 | 9/1995 | Dutta ........................................ | 375/322 |
| 5,537,437 | 7/1996 | Kaku et al. .............................. | 375/231 |
| 5,598,434 | 1/1997 | Kaku et al. .............................. | 375/230 |

FOREIGN PATENT DOCUMENTS

| | | |
|---|---|---|
| 0 025 675 | 3/1981 | European Pat. Off. . |
| 0 097 723 A1 | 1/1984 | European Pat. Off. . |
| 2 128 456 | 4/1984 | United Kingdom . |
| 2 275 398 | 8/1994 | United Kingdom . |

*Primary Examiner*—Chi H. Pham
*Assistant Examiner*—William Luther
*Attorney, Agent, or Firm*—Nikaido, Marmelstein, Murray & Oram LLP

[57] ABSTRACT

The invention provides a training method for a non-Nyquist transmission system and a training data transmission apparatus for a non-Nyquist transmission system by which initialization processing of a reception section can be performed with certainty even where a non-Nyquist transmission system is employed. Prior to transmission of data in accordance with a non-Nyquist transmission system, training data having a first repeat signal portion formed from a group of signals including components of a lower rate than a Nyquist interval, a first multi-value random signal portion formed from multi-value random signals, a second repeat signal portion formed from a group of signals including components of a lower rate than the Nyquist interval, a third repeat signal portion formed from a group of signals which include components lower in rate than the Nyquist interval and wherein a first signal point is different by 180 degrees in phase from a first signal which forms the second repeat signal portion, and a second multi-value random signal portion formed from multi-value random signals, are transmitted from a transmission section. The training data are received by a reception section, and initialization processing of the reception section is performed using the received training data.

17 Claims, 12 Drawing Sheets

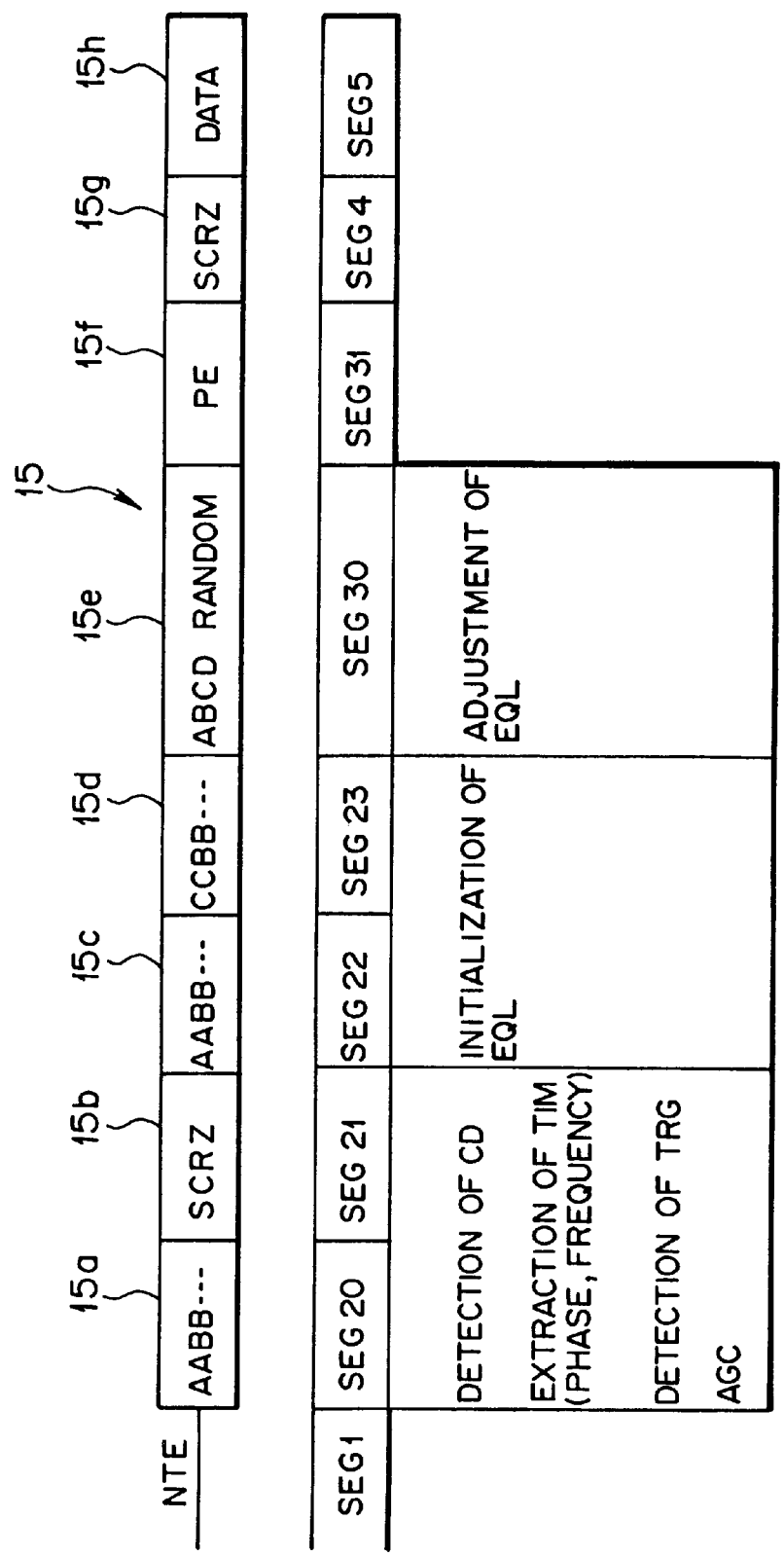

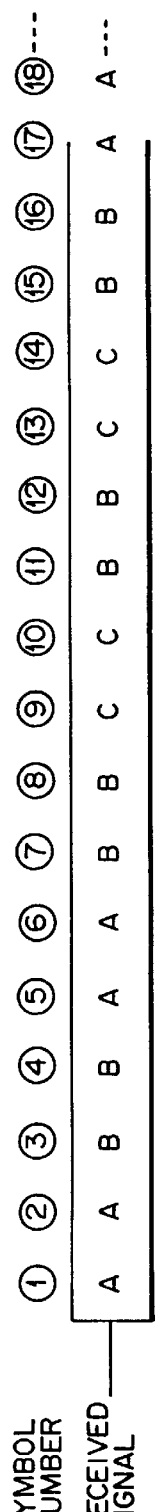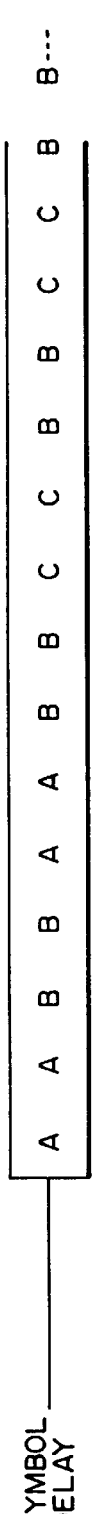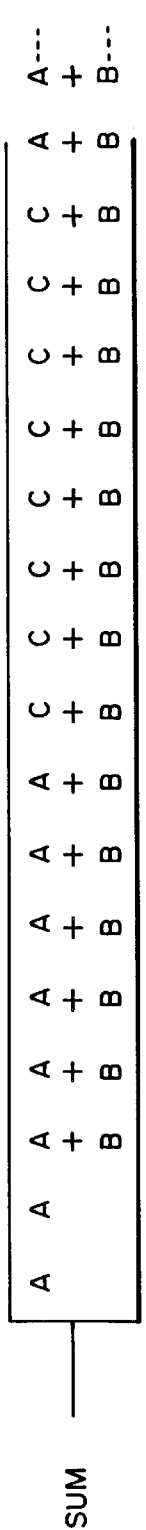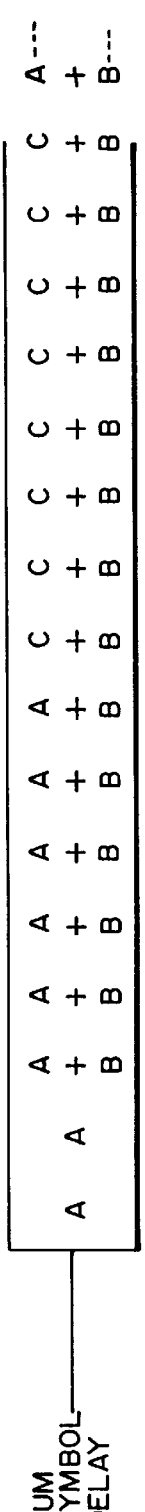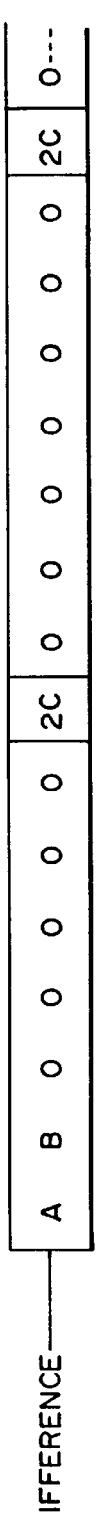

DATA SIGNAL
↰ SCRZ

FREQUENCY

TRAINING METHOD FOR NON-NYQUIST TRANSMISSION SYSTEM AND TRAINING DATA TRANSMISSION APPARATUS FOR NON-NYQUIST TRANSMISSION SYSTEM

BACKGROUND OF THE INVENTION

1. Field of the Invention

This invention relates to a training method for a non-nyquist transmission system and a training data transmission apparatus for a non-nyquist transmission system.

2. Description of the Related Art

Various modems (modulator-demodulators) for use for transmission of data which can transmit data at various transmission rates have generally been provided.

For example, modems for the transmission rate of 9,600 bit/sec according to the Recommendation V. 29 adopt, as a transmission system therefor, the Nyquist transmission system. Here, according to the Nyquist transmission system, signal points arranged at Nyquist intervals (Nyquist frequency (refer to FIG. 10($a$))) on the time base are transmitted at the Nyquist intervals, and signal points can be transmitted without inter symbol interference with any other signal point.

Further, upon transmission of data, a modem modulates and transmits training data of a required pattern prior to transmission of the data, and the training data are demodulated by a demodulation section. Then, using the thus demodulated training data, initialization processing of a reception section of the model is performed.

In particular, a reception section of a modem includes, in addition to a demodulation section, a roll-off filter, an automatic gain control section (AGC), an automatic equalization section (AEQ), a carrier phase correction section (CAPC), a timing extraction section, a carrier detection section and so forth. Upon starting of transmission of data, those sections must be initialized. Optimum signals necessary for such initialization processing are: for example, a tone signal for the automatic gain control section; a tone signal or an impulse signal for the carrier phase correction section; $\pi/\pi$ signals (two signals having phases different by 180 degrees from each other) for the timing extraction section; and a tone signal for the carrier detection section. It is to be noted that, in order to perform initialization processing for the automatic equalization section, an impulse signal is regenerated and used for the initialization processing.

Thus, training data of a required pattern are sent prior to transmission of data so that such optimum signals (optimum pattern) as mentioned above may be supplied to the various sections of the reception section of the modem.

An exemplary one of training patterns (training data) which satisfy the requirement described above is illustrated in FIG. 15. Referring to FIG. 15, the training pattern 100 shown has a first repeat signal portion (SEG2) 100$a$ in which signals A and B whose signal points have phases different by 90 degrees from each other are arranged alternately, and a multi-value random signal portion (SEG3) 100$b$ which is positioned subsequently to the first repeat signal portion 100$a$ and wherein signals C and D whose signal points have phases different by 180 degrees from those of the signal points of the signals A and B, respectively, and different by 90 degrees from each other are arranged at random. It is to be noted that, subsequently to the multi-value random signal portion (SEG3) 100$b$, scramble Z (SCRZ) signals (refer to SEG4) obtained by scrambling Z-polarity data in transmission data are sent, and thereafter, data (refer to SEG5) are sent.

If signal points on a phase plane of the signals A to D mentioned above are denoted by the same reference characters as those used to represent the signals, then the arrangement of the signal points of the signals A to D is such as as seen in FIG. 16. Referring to FIG. 16, the signal points A. B. C and D are displaced by 90 degrees in phase from each other.

Since a tone component and a $\pi/\pi$ component are included in the training signal of the ABAB . . . pattern, a tone signal and $\pi/\pi$ signals can be regenerated by suitable operation processing of the training signal. Further, from the CD random signals, a flat spectrum is obtained to perform adjustment of the automatic equalization section.

By the way, in recent years, very high speed modems having the transmission rate of, for example, 28.8 kbps have been proposed. Some of such high speed modems do not adopt the Nyquist transmission system but adopt a non-Nyquist transmission system. Here, the non-Nyquist transmission system is regarded as a transmission system by which signal points disposed between two Nyquist intervals are sent at Nyquist intervals on the time base, and transmits signal points with inter symbol interference with other signal points.

However, where such non-Nyquist transmission system is adopted, if a training signal which has generally been used in the Nyquist transmission system is used as it is, then a timing phase cannot be extracted by the reception section also because the non-Nyquist transmission system involves no Nyquist frequency.

Therefore, a modem which adopts a non-Nyquist transmission system requires a new training method which employs novel training data.

It is to be noted that also any other transmission apparatus than a modem which adopts a non-Nyquist transmission system similarly requires a new training method.

SUMMARY OF THE INVENTION

It is an object of the present invention to provide a training method for a non-Nyquist transmission system and a training data transmission apparatus for a non-Nyquist transmission system by which initialization processing of a reception section can be performed with certainty even where a non-Nyquist transmission system is employed.

In order to attain the object described above, according to an aspect of the present invention, there is provided a training method for a non-Nyquist transmission system, which comprises the steps of transmitting from a transmission section, upon transmission of data in accordance with the non-Nyquist transmission system, prior to transmission of the data, training data having a first repeat signal portion formed from a group of signals including components of a lower rate than a Nyquist interval, and receiving, by a reception section, the training data and performing initialization processing of the reception section using the received training data.

With the training method for a non-Nyquist transmission system, a frequency lower than a Nyquist frequency (for example, one nth of the Nyquist frequency: n is an integral number) can be transmitted to send power, and consequently, detection of a carrier, detection of training data and extraction of a timing frequency can be performed. Accordingly, the training method for a non-Nyquist transmission system is advantageous in that training for initialization can be performed with certainty for a transmission apparatus which employs a non-Nyquist transmission system.

According to another aspect of the present invention, there is provided a training method for a non-Nyquist transmission system, which comprises the steps of transmitting from a transmission section, upon transmission of data in accordance with the non-Nyquist transmission system, prior to transmission of the data, training data having a first repeat signal portion formed from a group of signals including components of a lower rate than a Nyquist interval and a first multi-value random signal portion positioned subsequently to the first repeat signal portion and formed from multi-value random signals, and receiving, by a reception section, the training data and performing initialization processing of the reception section using the received training data.

With the training method for a non-Nyquist transmission system, a timing phase can be extracted. Accordingly, also the training method for a non-Nyquist transmission system is advantageous in that training for initialization can be performed with certainty for a transmission apparatus which employs a non-Nyquist transmission system.

According to a further aspect of the present invention, there is provided a training method for a non-Nyquist transmission system, which comprises the steps of transmitting from a transmission section, upon transmission of data in accordance with the non-Nyquist transmission system, prior to transmission of the data, training data having a second repeat signal portion formed from a group of signals including components of a lower rate than a Nyquist interval and a third repeat signal portion positioned subsequently to the second repeat signal portion and formed from a group of signals which include components lower in rate than a Nyquist interval and wherein a first signal point is different by 180 degrees in phase from a first signal which forms the second repeat signal portion, and receiving, by a reception section, the training data and performing initialization processing of the reception section using the received training data.

With the training method for a non-Nyquist transmission system, initialization of an automatic equalization section can be performed making use of data of the second and third repeat signal portions of the training data. Accordingly, also the training method for a non-Nyquist transmission system is advantageous in that training for initialization can be performed with certainty for a transmission apparatus which employs a non-Nyquist transmission system.

According to a still further aspect of the present invention, there is provided a training method for a non-Nyquist transmission system, which comprises the steps of transmitting from a transmission section, upon transmission of data in accordance with the non-Nyquist transmission system, prior to transmission of the data, training data having a second multi-value random signal portion formed from multi-value random signals, and receiving, by a reception section, the training data and performing initialization processing of the reception section using the received training data.

With the training method for a non-Nyquist transmission system, a flat spectrum can be obtained using the second multi-value random signal portion of the training data, and an automatic equalization section can be adjusted using the thus obtained flat spectrum. Accordingly, also the training method for a non-Nyquist transmission system is advantageous in that training for initialization can be performed with certainty for a transmission apparatus which employs a non-Nyquist transmission system.

According to a yet further aspect of the present invention, there is provided a training method for a non-Nyquist transmission system, which comprises the steps of transmitting from a transmission section, upon transmission of data in accordance with the non-Nyquist transmission system, prior to transmission of the data, training data having a first repeat signal portion formed from a group of signals including components of a lower rate than a Nyquist interval, a first multi-value random signal portion and a second repeat signal portion positioned subsequently to the first repeat signal portion, the first multi-value random signal portion being formed from multi-value random signals, the second repeat signal portion being formed from a group of signals including components of a lower rate than the Nyquist interval, and a third repeat signal portion and a second multi-value random signal portion positioned subsequently to the second repeat signal portion, the third repeat signal portion being formed from a group of signals which include components lower in rate than the Nyquist interval and wherein a first signal point is different by 180 degrees in phase from a first signal which forms the second repeat signal portion, the second multi-value random signal portion being formed from multi-value random signals, and receiving, by a reception section, the training data and performing initialization processing of the reception section using the received training data.

With the training method for a non-Nyquist transmission system, all of detection of a carrier, detection of training data, extraction of a timing frequency and a phase, and initialization and adjustment of an automatic equalization section can be performed. Accordingly, also the training method for a non-Nyquist transmission system is advantageous in that training for initialization can be performed with certainty for a transmission apparatus which employs a non-Nyquist transmission system. The training method for a non-Nyquist transmission system is further advantageous in that high speed data transmission can be achieved, which contributes very much to improvement in performance of a transmission apparatus.

According to a yet further aspect of the present invention, there is provided a training data transmission apparatus for a non-Nyquist transmission system for transmitting training data for initialization of a reception section in accordance with the non-Nyquist transmission system, which comprises training data generation means for generating the training data, and control means for sending a control signal to the training data generation means to control the training data generation means to generate the training data having a first repeat signal portion formed from a group of signals including components of a lower rate than a Nyquist interval, a first multi-value random signal portion and a second repeat signal portion positioned subsequently to the first repeat signal portion, the first multi-value random signal portion being formed from multi-value random signals, the second repeat signal portion being formed from a group of signals including components of a lower rate than the Nyquist interval, and a third repeat signal portion and a second multi-value random signal portion positioned subsequently to the second repeat signal portion, the third repeat signal portion being formed from a group of signals which include components lower in rate than the Nyquist interval and wherein a first signal point is different by 180 degrees in phase from a first signal which forms the second repeat signal portion, the second multi-value random signal portion being formed from multi-value random signals.

With the training data transmission apparatus for a non-Nyquist transmission system, training data for detection of a carrier, detection of training data, extraction of a timing frequency and a phase, and initialization and adjustment of an automatic equalization section can be produced with such a simple construction as described above. Accordingly, also the training data transmission apparatus for a non-Nyquist transmission system is advantageous in that training for initialization can be performed with certainty for a transmission apparatus which employs a non-Nyquist transmission system. The training data transmission apparatus for a non-Nyquist transmission system is further advantageous in that high speed data transmission can be achieved, which contributes very much to improvement in performance of a transmission apparatus.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 6 is a diagrammatic view illustrating a construction of training data employed in the on-line system of FIG. 2;

FIGS. 7(a) to 7(f) are diagrams illustrating an example of a manner of regeneration of an impulse signal from the training data illustrated in FIG. 6;

DESCRIPTION OF THE PREFERRED EMBODIMENT a. Aspect of the Invention

An aspect of the present invention will first be described with reference to the drawings.

Figure 1:
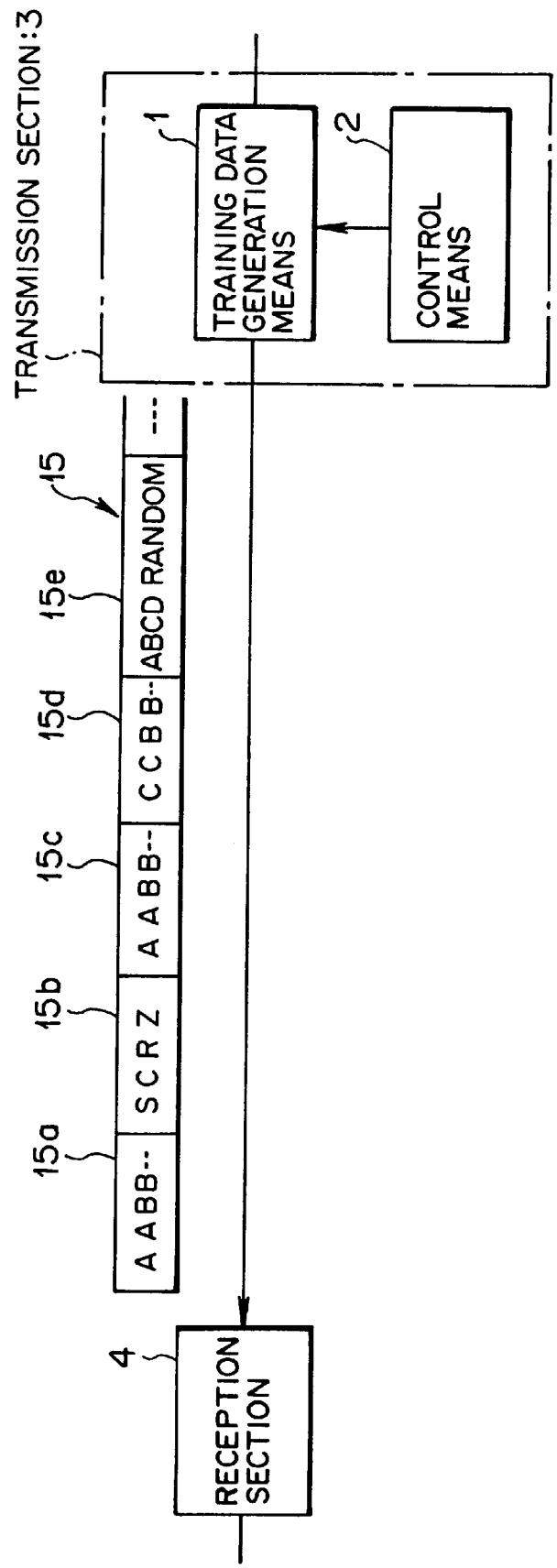
FIG. 1 is a block diagram illustrating an aspect of the present invention.

FIG. 1 shows in block diagram a training data transmission apparatus for a non-Nyquist transmission system to which the present invention is applied. The training data transmission apparatus shown includes training data generation means 1 provided in a transmission section 3 for generating training data for initialization of a data reception section 4 in accordance with a non-Nyquist transmission system.

The training data transmission apparatus further includes control means 2 for sending a control signal to the training data generation means 1 to control the training data generation means 1 so as to generate, prior to transmission of data, training data 15 which have a first repeat signal portion 15a, a first multi-value random signal portion 15b and a second repeat signal portion 15c, and a third repeat signal portion 15d and a second multi-value random signal portion 15e.

The first repeat signal portion 15a is formed from a group of signals (AABB . . .) which includes components of a lower rate than a Nyquist interval, and more particularly, from a group of signals (AABB . . .) which have a lower rate than the Nyquist interval and whose signal points have phases different by 90 degrees in phase from each other. The first multi-value random signal portion 15b is positioned subsequently to the first repeat signal portion 15a and formed from multi-value random signals (SCRZ).

The second repeat signal portion 15c is positioned subsequently to the first multi-value random signal portion 15b and is formed from a set of signals (AABB . . .) which includes components of a lower rate than the Nyquist interval, and more particularly, from a group of signals (AABB . . .) which have a lower rate than the Nyquist interval and whose signal points have phases different by 90 degrees in phase from each other. The third repeat signal portion 15d is positioned subsequently to the second repeat signal portion 15c and is formed from a set of signals (CCBB . . .) which includes components of a lower rate than the Nyquist interval and wherein the first signal point (C) has a phase different by 180 degrees from that of the first signal (A) forming the second repeat signal portion 15c. More particularly, the third repeat signal portion 15d is positioned subsequently to the second repeat signal portion 15c and is formed from a set of signals (CCBB . . .) which includes components of a lower rate than the Nyquist interval and wherein the first signal point (C) has a phase different by 180 degrees from that of the first signal (A) forming the second repeat signal portion 15c and signal points formed by the signals are different by 90 degrees in phase from each other.

The second multi-value random signal portion 15e is formed from multi-value random signals (ABCD random).

The training data generation means 1 may include signal point generation means for generating four different signal points (A. B. C and D) which are different by 90 degrees in phase from each other, and multi-value random signal generation means for generating multi-value random signals (SCRZ).

The control means 2 may control the training data generation means 1 so that signals forming the first repeat signal portion 15a, the second repeat signal portion 15c, the third repeat signal portion 15d and the second multi-value random signal portion 15e are generated by the signal point generation means, and signals forming the first multi-value random signal portion 15b are generated by the multi-value random signal generation means.

Preferably, the random signals forming the second multi-value random signal portion 15e are four-value random signals.

Accordingly, according to the training method for a non-Nyquist transmission system of the present invention, upon transmission of data in accordance with the non- Nyquist transmission system, the training data 15 having the first repeat signal portion 15a, the first multi-value random signal portion 15b, the second repeat signal portion 15c, the third repeat signal portion 15d and the second multi-value random signal portion 15e are transmitted from the transmission section 3 prior to transmission of the data. The training data 15 are received by the reception section 4, and initialization processing of the reception section 4 is performed using the thus received training data 15.

Or, upon transmission of data in accordance with the non-Nyquist transmission system, training data at least having the first repeat signal portion 15a may be transmitted from the transmission section 3 prior to transmission of the data so that the training data 15 may be received by the reception section 4 and initialization processing of the reception section 4 may be performed using the thus received training data 15.

Else, upon transmission of data in accordance with the non-Nyquist transmission system, training data 15 at least having the first repeat signal portion 15a and the first multi-value random signal portion 15b may be transmitted from the transmission section 3 prior to transmission of the data so that the training data 15 may be received by the reception section 4 and initialization processing of the reception section 4 may be performed using the thus received training data 15.

Otherwise, upon transmission of data in accordance with the non-Nyquist transmission system, training data at least having the second repeat signal portion 15c and the third repeat signal portion 15d may be transmitted from the transmission section 3 prior to transmission of the data so that the training data 15 may be received by the reception section 4 and initialization processing of the reception section 4 may be performed using the thus received training data 15.

In this instance, the training data 15 including the second repeat signal portion 15c and the third repeat signal portion 15d are received by the reception section 4, and sum calculation processing is performed for the received training data to regenerate an impulse and initialization processing of the reception section 4 is performed using the regenerated impulse.

Or else, upon transmission of data in accordance with the non-Nyquist transmission system, training data 15 at least having the second multi-value random signal portion 15e may be transmitted from the transmission section 3 prior to transmission of the data so that the training data 15 may be received by the reception section 4 and initialization processing of the reception section 4 may be performed using the thus received training data 15.

Accordingly, with the training method for a non-Nyquist transmission system described above, a frequency lower than the Nyquist frequency (for example, one nth of the Nyquist frequency: n is an integral number) can be transmitted to send power, and consequently, detection of a carrier, detection of training data and extraction of a timing frequency can be performed. Accordingly, training for initialization can be performed with certainty also for a transmission apparatus which employs a non-Nyquist transmission system.

Further, with the training method for a non-Nyquist transmission system, since initialization processing of the reception section 4 is performed using the training data 15 having the first repeat signal portion 15a and the first multi-value random signal portion 15b, a timing phase can be extracted. Accordingly, also here, training for initialization can be performed with certainty for a transmission apparatus which employs a non-Nyquist transmission system.

Furthermore, with the training method for a non-Nyquist transmission system, initialization of the automatic equalization section can be performed making use of data of the second repeat signal portion 15c and the third repeat signal portion 15d of the training data 15. Accordingly, also here, training for initialization can be performed with certainty for a transmission apparatus which employs a non-Nyquist transmission system.

In this instance, by regenerating an impulse from the training data 15 having the second repeat signal portion 15c and the third repeat signal portion 15d and performing initialization processing of the reception section 4 using the regenerated impulse, initialization of the automatic equalization section can be performed with certainty.

Further, with the training method for a non-Nyquist transmission system, since a flat spectrum can be obtained using the second multi-value random signal portion 15e of the training data 15, the automatic equalization section can be adjusted using the thus obtained flat spectrum. Accordingly, also here, training for initialization can be performed with certainty for a transmission apparatus which employs a non-Nyquist transmission system.

Furthermore, with the training method for a non-Nyquist transmission system, since initialization processing of the reception section 4 is performed using the training data 15 having the first repeat signal portion 15a, the first multi-value random signal portion 15b, the second repeat signal portion 15c, the third repeat signal portion 15d and the second multi-value random signal portion 15e, all of detection of a carrier, detection of training data, extraction of a timing frequency and a phase, and initialization and adjustment of an automatic equalization section can be performed. Accordingly, also here, training for initialization can be performed with certainty for a transmission apparatus which employs a non-Nyquist transmission system. Further, high speed data transmission can be achieved, which contributes very much to improvement in performance of a transmission apparatus.

Meanwhile, with the training data transmission apparatus for a non-Nyquist transmission system described above, the training data 15 for detection of a carrier, detection of training data, extraction of a timing frequency and a phase, and initialization and adjustment of the automatic equalization section can be produced with a simple construction wherein the control means 2 for controlling the training data generation means 1 is provided as described above. Accordingly, also here, training for initialization can be performed with certainty for a transmission apparatus which employs a non-Nyquist transmission system. Further, high speed data transmission can be achieved, which contributes very much to improvement in performance of a transmission apparatus.

Where the training data generation means 1 includes signal point generation means and multi-value random signal generation means as described above, the training data 15 can be produced readily with certainty.

Further, where the control means 2 controls the training data generation means 1 so that signals forming the first repeat signal portion 15a, the second repeat signal portion 15c, the third repeat signal portion 15d and the second multi-value random signal portion 15e are generated by the signal point generation means and signals forming the first multi-value random signal portion 15b are generated by the multi-value random signal generation means, the training data 15 can be produced effectively.

Furthermore, where the random signals forming the second multi-value random signal portion 15e are four-value random signals, the training data transmission apparatus can be designed readily and produced advantageously.

b. Description of the Preferred Embodiment

A preferred embodiment of the present invention will be described below with reference to the drawings.

Figure 2:
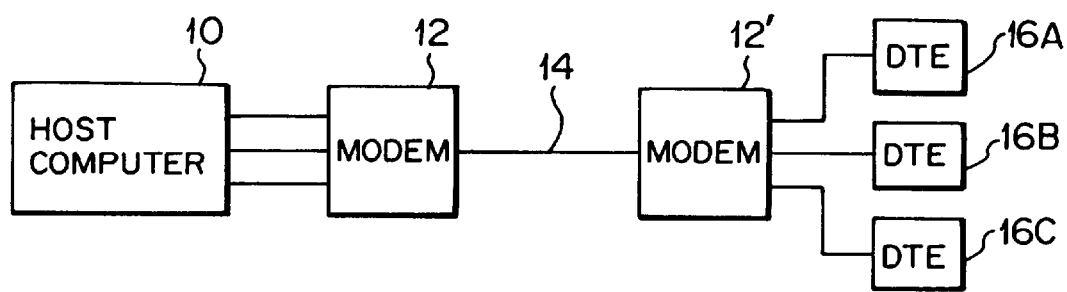
FIG. 2 is a block diagram of an on-line system to which the present invention is applied.

Referring to FIG. 2, there is shown in block diagram an on-line system to which the present invention is applied. The on-line system shown includes a host computer 10, a modem 12 connected to the host computer 10 by way of a communication control apparatus (CCP) (not shown), and a modem 12' located at another location and connected to the modem 12 by way of an analog line (private line) 14. Terminals 16A to 16C serving as working stations are connected to the modem 12'.

The modems 12 and 12' are each constructed as a very high speed modem having a transmission rate of, for example, 28.8 kbps. Each of the modems 12 and 12' time division processes and modulates, for example, a main channel for three main data and a secondary channel for a secondary data for supervision of the network and transmits a resulted signal in accordance with a non-Nyquist transmission system whereas it demodulates a reception signal to regenerate such individual data (main data and secondary data). Further, each of the modems 12 and 12' transmits, prior to transmission of data, training data having a training pattern which will be hereinafter described, so that initialization processing of a reception section can be performed using the training data.

Figure 4:
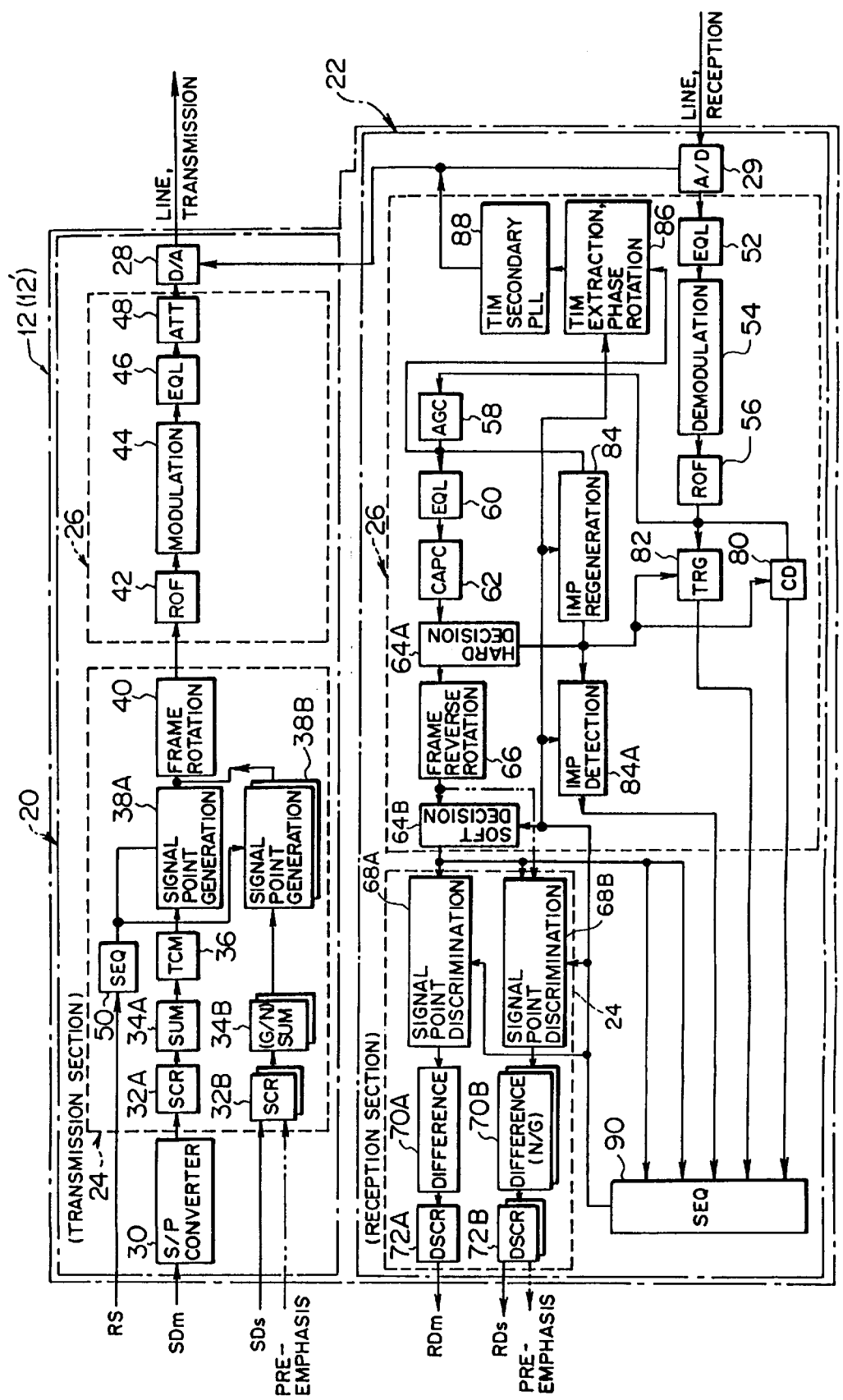
FIG. 4 is a block diagram showing details of the modem shown in FIG. 2.

The modem 12 which serves as a parent station includes, in order to exhibit the functions described above, a transmission section 20 with a modulation function and a reception section 22 with a demodulation function as shown in FIG. 4, and further includes a transmission low-pass filter and a transmission amplifier (not shown) on the output side of the transmission section 20 and a reception amplifier and a reception low-pass filter (not shown) on the input side of the reception section 22.

Figure 3:
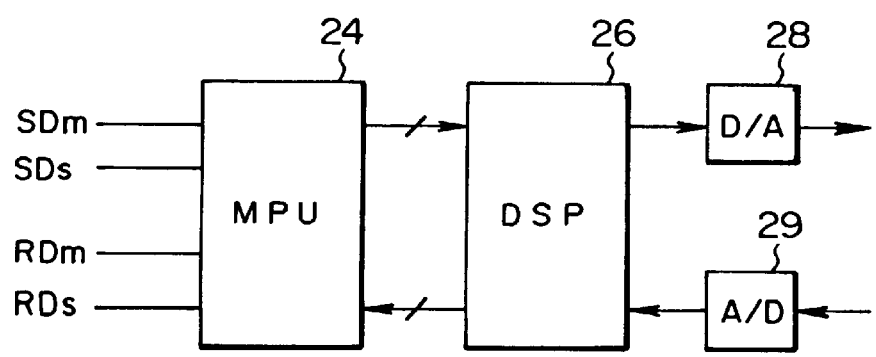
FIG. 3 is a block diagram showing a construction of a component of a modem employed in the on-line system of FIG. 2.

Each of the transmission section 20 and the reception section 22 is formed from, as shown in FIG. 3, a microprocessor unit (MPU) 24, a digital signal processor (DSP) 26, a digital to analog converter (D/A) 28 and an analog to digital converter (A/D) 29. Each of the MPU 24 and the DSP 26 constituting the transmission section 20 or the reception section 22 is provided suitably by a plural number depending upon the capacity or the processing capability required therefor.

Essential part of the modem 12 will be described in more detail. Referring to FIG. 4, the transmission section 20 of the modem 12 includes a serial to parallel converter (S/P converter) 30, a pair of scramblers (SCR) 32A and 32B, a pair of sum calculation sections 34A and 34B, a trellis-coded modulation section (TCM) 36, a pair of signal point generation sections 38A and 38B, a frame rotation section 40, a roll-off filter (ROF) 42, a modulation section 44, a fixed equalization section (EQL) 46, an attenuator (ATT) 48, a sequencer (SEQ) 50 serving as a control section, and so forth.

The serial to parallel converter 30 converts main channel data SDm from serial data into parallel data. The scramblers 32A and 32B individually randomize signals (main channel data SDm and secondary data SDs, and pre-emphasis data).

The sum calculation section 34A performs a sum calculation of the output of the scrambler 32A while the other sum calculation section 34B performs a sum calculation of the output of the scrambler 32B. The sum calculation section 34B also has a gray to natural code (G/N) conversion function which is used upon training. The reason why the sum calculations of the two data are performed by the sum calculation sections 34A and 34B is that the transmission data are transmitted as relative difference data regarding preceding and following points of time. The trellis-coded modulation section 36 performs processing for correction of errors.

The signal point generation sections 38A and 38B generate desired signal points from the main channel data SDm and the secondary data SDs, respectively, but produce, upon initialization, training data, which will be hereinafter described, in response to a control signal from the sequencer 50.

The frame rotation section 40 rotates a frame in order to perform re-leading-in when a step-out occurs. The roll-off filter 42 passes only signals of a digital output within a predetermined frequency range therethrough and thus has a function of a low-pass filter.

The modulation section 44 performs modulation processing of the output of the roll-off filter 42 and has a carrier frequency set, for example, to 1,850 Hz.

The fixed equalization section 46 equalizes a delay, an amplitude component on a line and so forth. The attenuator 48 adjusts the level of the output of the fixed equalization section 46.

The sequencer 50 serving as a control section controls the function sections 30 to 48 of the transmission section 20 described above. The sequencer 50 also controls, upon initialization, the signal point generation sections 38A and 38B so as to produce training data which will be hereinafter described. Details of the control will be hereinafter described in detail.

The functions of the scramblers 32A and 32B, sum calculation sections 34A and 34B, trellis-coded modulation section 36, signal point generation sections 38A and 38B, frame rotation section 40 and sequencer 50 of the transmission section 20 are provided by the MPU 24, and the functions of the roll-off filter 42, modulation section 44, fixed equalization section 46 and attenuator 48 are provided by the DSP 26.

The reception section 22 of the modem 12 includes a fixed equalizer (EQL) 52, a demodulation section 54, a roll-off filter (band separation filter) (ROF) 56, an automatic gain control section (AGC) 58, an automatic equalization section (EQL) 60, a carrier phase correction section (CAPC) 62, a hard decision section 64A, a frame reverse rotation section 66, a soft decision section 64B, a pair of signal point discrimination sections 68A and 68B, a pair of difference calculation sections 70A and 70B, and a pair of descramblers 72A and 72B. The reception section 22 further includes a carrier detection section (CD) 80, a training data detection section (TRG) 82, an impulse (IMP) regeneration section 84, an impulse (IMP) detection section 84A, a timing (TIM) extraction section 86, a timing locking section (TIM secondary PLL) 88, a sequencer (SEQ) 90 serving as a control section, and so forth.

The fixed equalizer 52 equalizes a delay, an amplitude component on a line and so forth. The demodulation section 54 demodulates a reception signal after converted into a digital signal by the analog to digital converter 29. The roll-off filter 56 passes only a signal of the digital output of the demodulation section 54 within a predetermined frequency range, and a decimation filter is used for the roll-off filter 56.

The automatic gain control section 58 constructs automatic reception level adjustment means which adjusts the loop gain so that the level of a demodulated signal bandlimited by the roll-off filter 56 may be a predetermined reference value and inputs the modulated signal of the thus adjusted level to the automatic equalization section 60 at the following stage. The automatic gain control section 58 is thus required to allow the automatic equalization section 60 at the following stage to operate accurately.

The automatic equalization section 60 performs equalization processing to correct a transmission distortion of a line and so forth. The carrier phase correction section 62 forecasts a frequency offset, phase jitters or a phase intercept variation from the output of the automatic equalization section 60 and removes (or suppresses) the same to correct the carrier phase.

The hard decision section 64A outputs a false reference signal corresponding to an input signal thereto. The soft decision section 64B receives the false reference signal from the hard decision section 64A and performs viterbi decoding or the like to correct an error of an input signal thereto. The hard decision section 64A and the soft decision section 64B function as pre-signal discrimination sections.

The frame reverse rotation section 66 is provided to eliminate a step-out condition. The signal point discrimination section 68A discriminates signal points of main data while the other signal point discrimination section 68B discriminates, in its normal operation, signal points of secondary data. The signal point discrimination section 68B further discriminates, upon training, four values of the output of the frame reverse rotation section 66 (secondary data which have not undergone discrimination by the soft decision section 64B).

The difference calculation section 70A performs a difference calculation of the output of the signal point discrimination section 68A while the other difference calculation section 70B performs a difference calculation of the output of the signal point discrimination section 68B. The difference calculation section 70B also has a natural to gray code (N/G) conversion function which is used upon training. The difference calculation sections 70A and 70B have a function of returning transmitted relative difference data into original data.

The descramblers 72A and 72B process signals randomized by the scramblers 32A and 32B to obtain original signals and output the thus obtained signals as main data RDm and secondary data RDs, respectively.

The carrier detection section 80 detects a carrier to detect whether or not data are received. The output of the carrier detection section 80 is supplied to the sequencer 90.

The training data detection section 82 detects training data to detect the beginning of training. Also the output of the training data detection section 82 is supplied to the sequencer 90.

Figure 5:
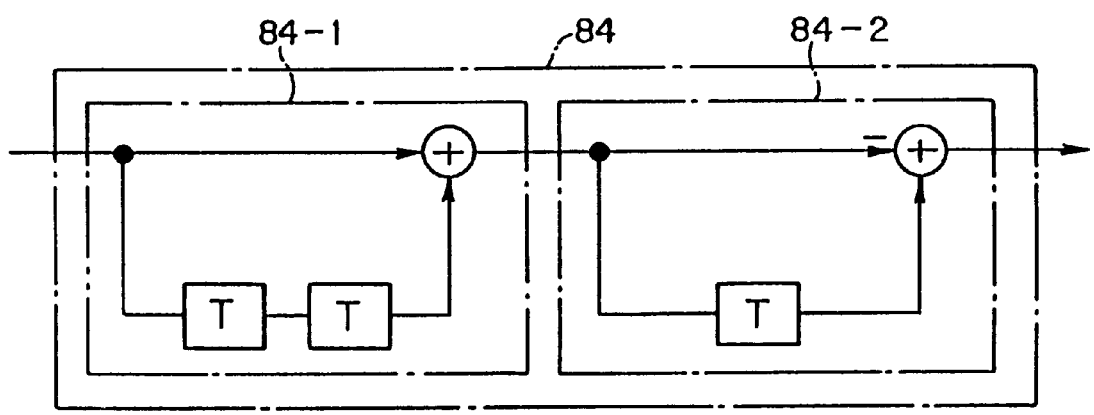
FIG. 5 is a block diagram showing a construction of an impulse detection section shown in FIG. 4.

The impulse regeneration section 84 regenerates an impulse from training data and includes, as shown in FIG. 5, a first sum calculation section 84-1 and a second sum calculation section 84-2. The first sum calculation section 84-1 performs a sum calculation of an input signal thereto and another signal obtained by delaying the input signal by a two symbol interval. Meanwhile, the second sum calculation section 84-2 performs a sum calculation of a signal obtained by delaying an input signal thereto by a one symbol interval and another signal obtained by inverting the input signal. The impulse regeneration section 84 can thus regenerate a desired impulse when unique training data having a pattern which will be hereinafter described are inputted to the impulse regeneration section 84. The impulse detection section 84A detects an impulse regenerated by the impulse regeneration section 84. Also the output of the impulse detection section 84A is supplied to the sequencer 90.

The timing extraction section 86 extracts a signal timing from the output of the automatic gain control section 58 and discriminates at which position the signal timing is. The timing locking section 88 locks the output of the timing extraction section 86 using a PLL (phase-locked loop) circuit.

The sequencer 90 serving as a control section controls the function units 52 to 88 of the reception section 22 described above.

It is to be noted that each alternate long and two short dashes line of the secondary data transmission and reception systems shown FIG. 4 represents a flow of a signal or data upon training.

The functions of the fixed equalizer 52, demodulation section 54, roll-off filter 56, automatic gain control section 58, automatic equalization section 60, carrier phase correction section 62, hard decision section 64A, frame reverse rotation section 66, soft decision section 64B, carrier detection section 80, training data detection section 82, impulse regeneration section 84, impulse detection section 84A, timing extraction section 86 and timing locking section 88 of the reception section 22 are provided by the DSP 26, and the functions of the signal point discrimination sections 68A and 68B, difference calculation sections 70A and 70B, and descramblers 72A and 72B of the reception section 22 are provided by the MPU 24.

It is to be noted that also the modem 12' serving as a child station has the same construction as that of the modem 12 serving as a parent station, and accordingly, overlapping description of the same is omitted herein to avoid redundancy.

By the way, in the present embodiment, when the transmission side modem tries to transmit data, the signal point generation sections 38A and 38B and the scramblers 32A and 32B of the modem which construct training data generation means cooperate with each other in accordance with an instruction from the sequencer 50 to generate, prior to transmission of the data to be transmitted, training data (data for initialization processing of a reception side modem upon transmission) having a required training pattern suitable for a non-Nyquist transmission system and transmits the thus generated training data to the reception side modem. When the training data are received by the reception side modem, signals for initialization are regenerated based on the training pattern to allow initialization processing of components of the reception side modem to be performed.

Figure 15:
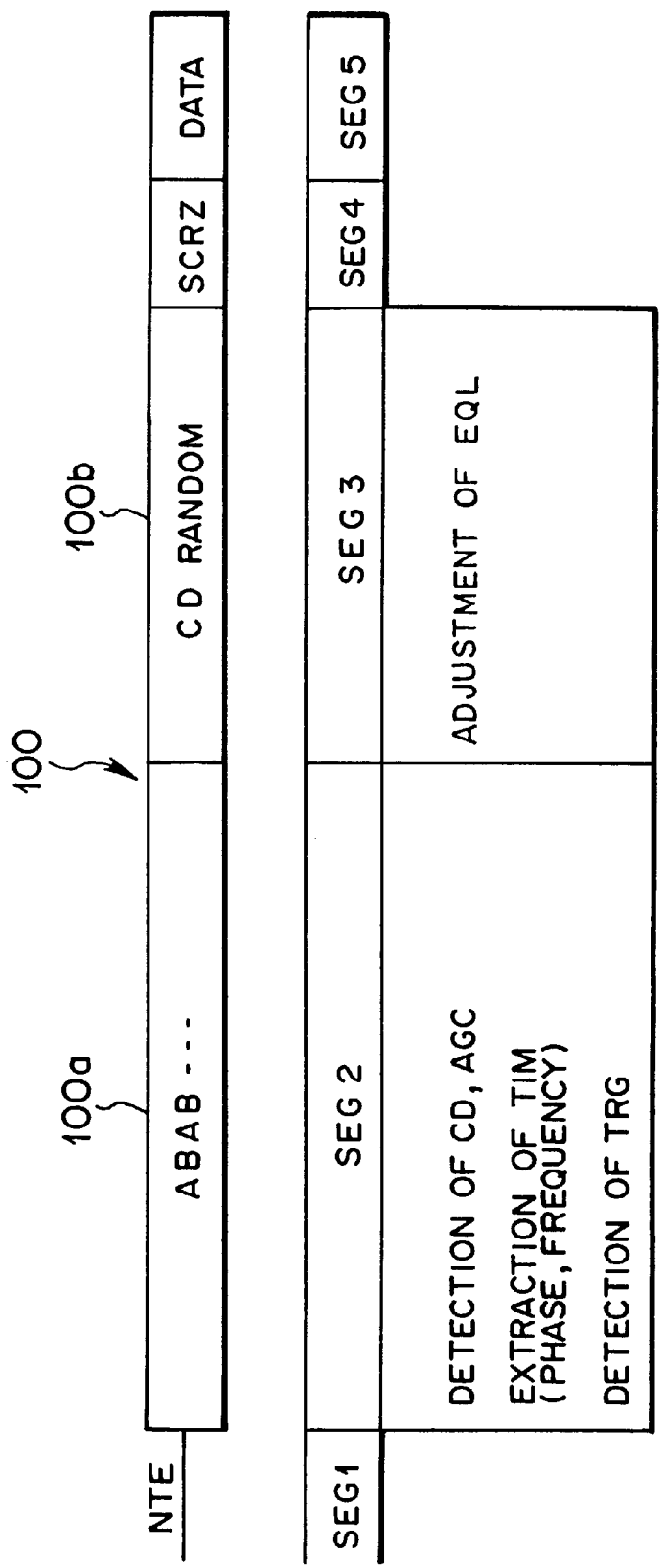
FIG. 15 is a diagrammatic view illustrating a construction of training data employed in general data transmission.

Referring now to FIG. 6, the training data 15 produced by the transmission side modem have a structure wherein a first repeat signal portion 15a (refer to SEG20), a first multi-value random signal portion 15b (refer to SEG21), a second repeat signal portion 15c (refer to SEG22), a third repeat signal portion 15d (refer to SEG23), and a second multi-value random signal portion 15e (refer to SEG30) appear successively and then a pre-emphasis signal portion 15f (refer to SEG31), a third multi-value random signal portion 15g (refer to SEG4) and a data portion 15h (refer to SEG5) appear successively. It is to be noted that the signal portions SEG20 to SEG23 correspond to the signal portion SEG2 of the general training data (refer to FIG. 15); the signal portions SEG30 and SEG31 correspond to the signal portion SEG3 of the general training data (refer to FIG. 15); and the signal portions SEG1, SEG4 and SEG5 correspond to the signal portions SEG1, SEG4 and SEG5 of the general training data (refer to FIG. 15). respectively.

The first repeat signal portion 15a (refer to SEG20) is formed from a set of signals (AABBAABB . . .) which includes components having a rate lower than the Nyquist interval, and more particularly, from a set of signals (AABBAABB . . .) which have a rate lower than the Nyquist interval (at intervals of two or more symbols (in the example shown, at intervals of two symbols)) and whose signal points have phases different by 90 degrees from each other. The first multi-value random signal portion 15b (refer to SEG21) is positioned subsequently to the first repeat signal portion 15a and is formed from scramble Z (SCRZ) signals in the form of multi-value random signals. Thus, the carrier detection section 80, the training data detection section 82, the timing extraction section 86 and so forth of the reception section 22 perform detection of a carrier, detection of training data and extraction of a timing, respectively, using data of the first repeat signal portion 15a and the first multi-value random signal portion 15b.

Figure 10A:
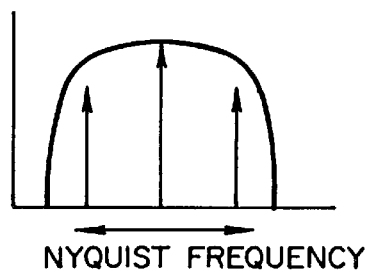
FIGS. 10(a) and 10(b) are spectrum diagrams illustrating different frequency extraction methods of timings.
Figure 10B:
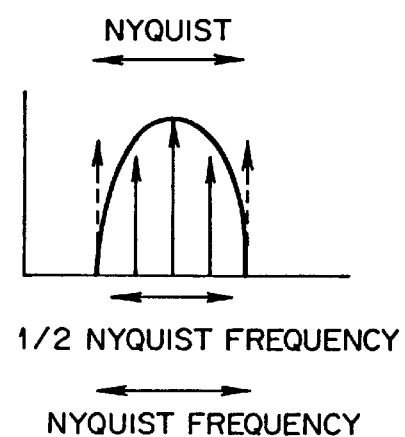
Figure 12:
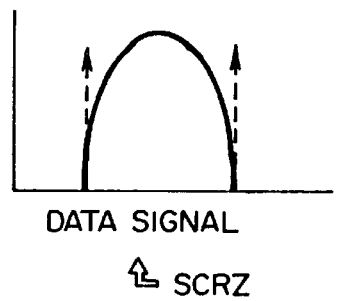
FIG. 12 is a spectrum diagram illustrating a phase extraction method of timings.

In particular, since signals are sent at a rate lower than the Nyquist interval (in the present example, at intervals of two symbols) in the first repeat signal portion 15a, the Nyquist frequency can be changed to a ½ Nyquist frequency as seen in FIG. 10(b) to output a component of one half of the Nyquist frequency to a line to send power, and this allows detection of a carrier, detection of training data and extraction of a timing frequency. Further, since the first multi-value random signal portion 15b is sent subsequently to the first repeat signal portion 15a, a timing phase can be extracted using end information of such a SCRZ signal spectrum as illustrated in FIG. 12 as auxiliary information.

Also initialization of the automatic gain control section 58 is performed using data of the first repeat signal portion 15a.

Figure 11A:
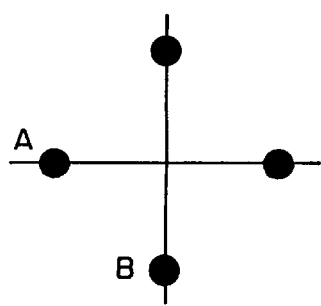
FIGS. 11(a) and 11(b) are diagrams showing arrangements of signal points illustrating the frequency extraction methods of timings illustrated in FIGS. 10(a) and 10(b)
Figure 11B:
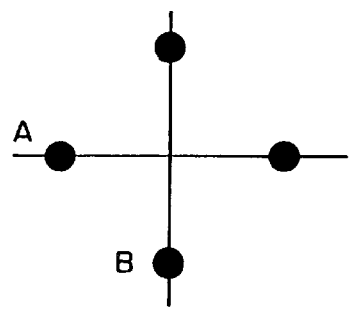

It is to be noted that, if signal points on a phase plane of the signals A and B described above are denoted by same reference characters as those used to denote the signals, then the arrangement of the signal points is such as illustrated in FIG. 11(b). As seen in FIG. 11(b), the signal points A and B are displaced by 90 degrees in phase from each other.

The second repeat signal portion (refer to SEG22) 15c is formed from a set of signals (AABBAABB . . .) which includes components of a rate lower than the Nyquist interval, and more particularly from a set of signals (AABBAABB . . .) which are lower in rate than the Nyquist interval (at intervals of two or more symbols (in the example shown, at intervals of two symbols)) and have signal points different by 90 degrees in phase from each other. The third repeat signal portion (refer to SET23) 15d is positioned subsequently to the second repeat signal portion 15c and is formed from a set of signals (CCBBCCBB . . .) which includes components of a lower rate than the Nyquist interval and wherein the first signal point (C) is different by 180 degrees in phase from the first signal (A) forming the second repeat signal portion 15c. More particularly, the third repeat signal portion 15d is positioned subsequently to the second repeat signal portion 15c and is formed from a set of signals (CCBBCCBB . . .) which are lower in rate than the Nyquist interval (at intervals of two or more symbols (in the present example, at intervals of two symbols)) and wherein the phase of the first signal point (C) is different by 180 degrees from that of the first signal (A) forming the second repeat signal portion 15c and the phases of the signal points are different by 90 degrees from each other. The impulse regeneration section 84 of the reception section 22 performs sum calculation processing using data of the second and third repeat signal portions 15c and 15d to regenerate an impulse, and initialization of the automatic equalization section 60 is performed using the thus regenerated impulse.

In particular, in the impulse regeneration section 84, the first sum calculation section 84-1 performs a sum calculation (refer to FIG. 7(c)) of an input signal (refer to FIG. 7(a)) and another signal (refer to FIG. 7(b)) obtained by delaying the input signal (refer to FIG. 7(a)) by a two symbol interval. The second sum calculation section 84-2 receives the output signal of the first sum calculation section 84-1 as an input signal (refer to FIG. 7(c)) thereto and performs a sum calculation (refer to FIG. 7(e)) of a signal (refer to FIG. 7(d)) obtained by delaying the input signal (refer to FIG. 7(c)) by a one symbol interval and another signal obtained by inverting the input signal (refer to FIG. 7(c)) to regenerate such an impulse as seen in FIG. 7(f). The impulse regenerated by the impulse regeneration section 84 in this manner is detected by the impulse detection section 84A, and initialization of the automatic equalization section 60 is performed using the impulse.

Figure 13A:
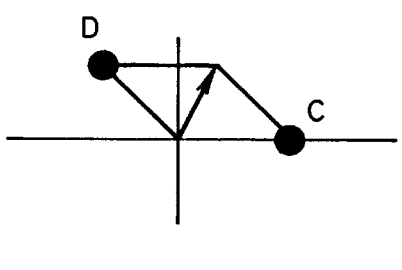
FIGS. 13(a) and 13(b) are diagrams showing arrangements of signal points and illustrating different adjusting methods for an automatic equalizer.
Figure 13B:
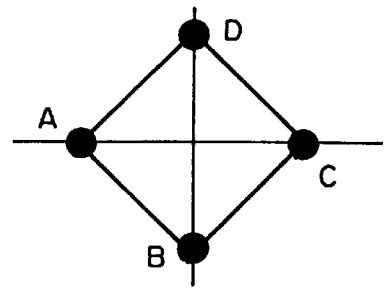

If signal points on a phase plane of the signals A to D are denoted by same reference characters as those used to denote the signals, then the arrangement of the signal points of the signals A to D is such as illustrated in FIG. 13(b). As seen in FIG. 13(b), the signal points A, B, C and D are displaced by 90 degrees in phase from each other.

Figure 14:
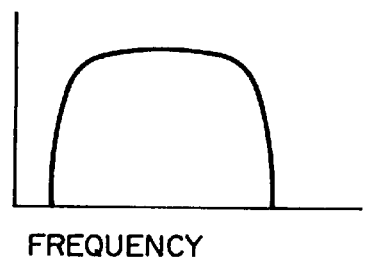
FIG. 14 is a spectrum diagram illustrating an adjusting method for an automatic equalizer.

The second multi-value random signal portion 15e (refer to SEG30) is formed from a four-value random signal (ABCD random) as a multi-value random signal. A flat spectrum (refer to FIG. 14) can be obtained using the second multi-value random signal portion 15e, and adjustment of the automatic equalization section 60 can be performed using the flat spectrum.

The pre-emphasis signal portion 15f (refer to SEG31) is formed from a pre-emphasis signal. The third multi-value random signal portion 15g (refer to SEG4) is positioned subsequently to the pre-emphasis signal portion 15f and is formed from a multi-value random signal (SCRZ).

It is to be noted that, for generation of training data, the signal point generation sections 38A and 38B function as signal point generation means for generating four different signal points (A, B, C and D) having phases different by 90 degrees from each other, and the scramblers 32A and 32B function as multi-value random signal generation means for generating multi-value random signals (SCRZ).

In this instance, signals forming the first repeat signal portion 15a, the second repeat signal portion 15c, the third repeat signal portion 15d and the second multi-value random signal portion 15e are generated by the signal point generation sections 38A and 38B which function as signal point generation means, and signals forming the first multi-value random signal portion 15b are generated by the scramblers 32A and 32B which function as multi-value random signal generation means.

It is to be noted that, for the random signals forming the second multi-value random signal portion 15e, random signals of two or more values can be used in place of such four-value random signals as described above. However, employment of four-value random signals facilitates designing and so forth and facilitates practical application.

Figure 8:
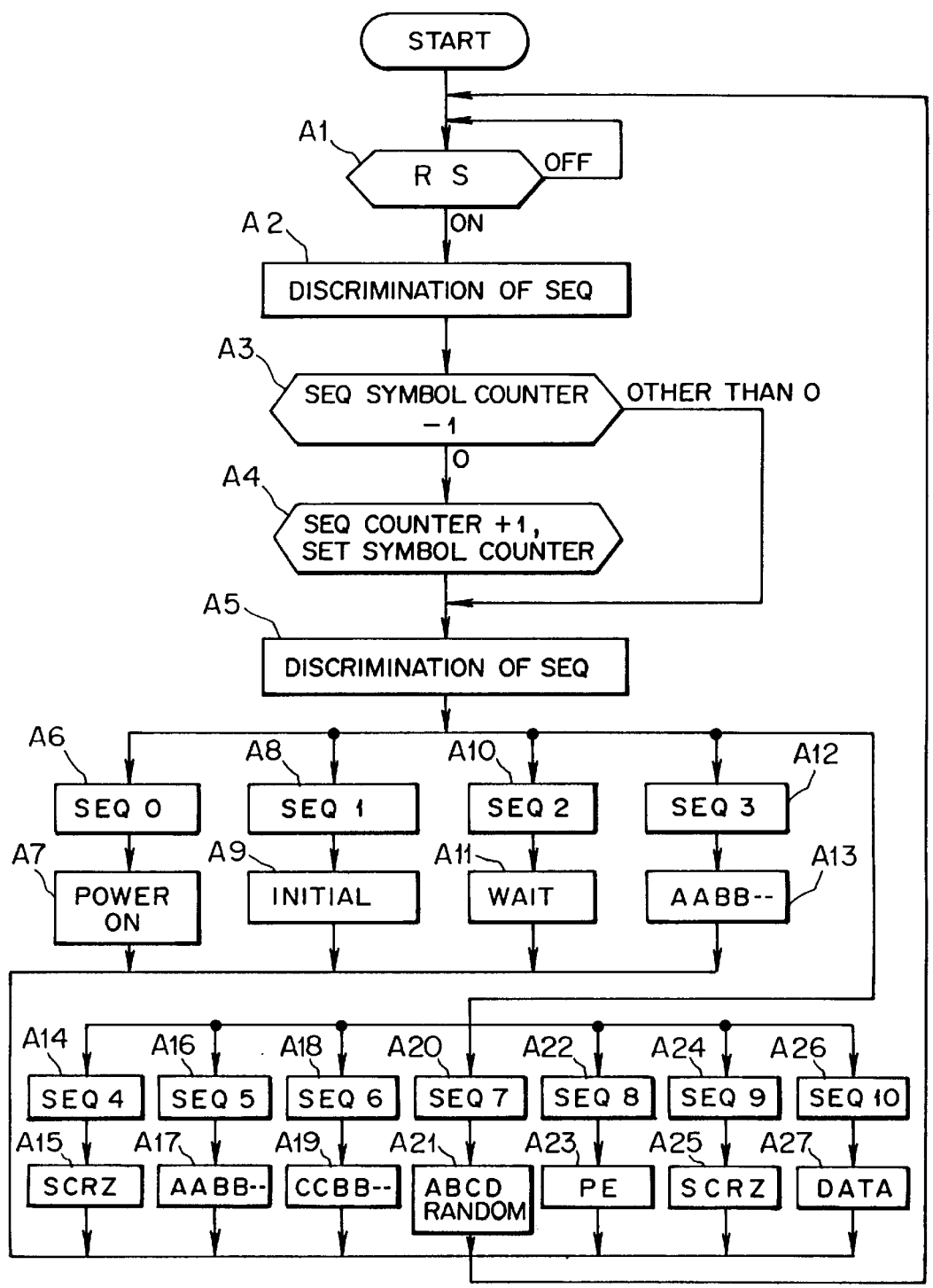
FIG. 8 is a flow chart illustrating production of training data by the modem shown in FIG. 4.

Further, upon transmission of data, the training data 15 having a required training pattern suitable for a non-Nyquist transmission system is generated, in the transmission modem, prior to transmission of data to be transmitted, by the signal point generation sections 38A and 38B and the scramblers 32A and 32B, which construct training data generation means, under the control of the sequencer 50. Details of the control of the sequencer 50 will be described subsequently with reference to the flow chart shown in FIG. 8.

First at step A1, it is discriminated by the sequencer 50 whether or not data are to be transmitted. When data are to be transmitted, the sequencer 50 discriminates a sequence number at step A2. Then at step A3, "1" is subtracted from a value of a symbol counter in the sequencer 50, and it is discriminated whether or not the difference thus calculated is equal to "0". If the difference value is "0", then "1" is added to the symbol counter value in the sequencer 50 and a resulted value is set to the symbol counter.

Thereafter, at step A5, the sequencer 50 discriminates the sequence number. It is to be noted that, when it is discriminated at step A3 that the difference value is not equal to "0", the control sequence advances directly to step A5 bypassing step A4.

Thereafter, processing corresponding to the sequence number is performed. In particular, when the sequence number is 0, the power is made available (steps A6 and A7); when the sequence number is 1, initialization is performed (steps A8 and A9); when the sequence number is 2, a waiting condition is entered (steps A10 and A11); when the sequence number is 3, "AABB . . ." signals (signals of the first repeat signal portion 15a) are produced (steps A12 and A13); when the sequence number is 4, SCRZ signals (signals of the first multi-value random signal portion 15b) is produced (steps A14 and A15); when the sequence number is 5, "AABB . . ." signals (signals of the second repeat signal portion 15c) are produced (steps A16 and A17); when the sequence number is 6, "CCBB . . ." signals (signals of the third repeat signal portion 15d) are produced (steps A18 and A19); when the sequence number is 7, ABCD random signals (signals of the second multi-value random signal portion 15e) are produced (steps A20 and A21); when the sequence number is 8, pre-emphasis signals are produced (steps A22 and A23); and when the sequence number is 9, SCRZ signals are produced (steps A24 and A25). It is to be noted that, when the sequence number is 10, the sequencer 50 controls so that data may be transmitted (steps A26 and A27).

Consequently, upon transmission of data in accordance with a non-Nyquist transmission system, the training data 15 having the first repeat signal portion 15a, first multi-value random signal portion 15b, second repeat signal portion 15c, third repeat signal portion 15d and second multi-value random signal portion 15e are produced under the control of the sequencer 50 and transmitted from the transmission section 20 prior to transmission of the data to be transmitted.

Figure 9:
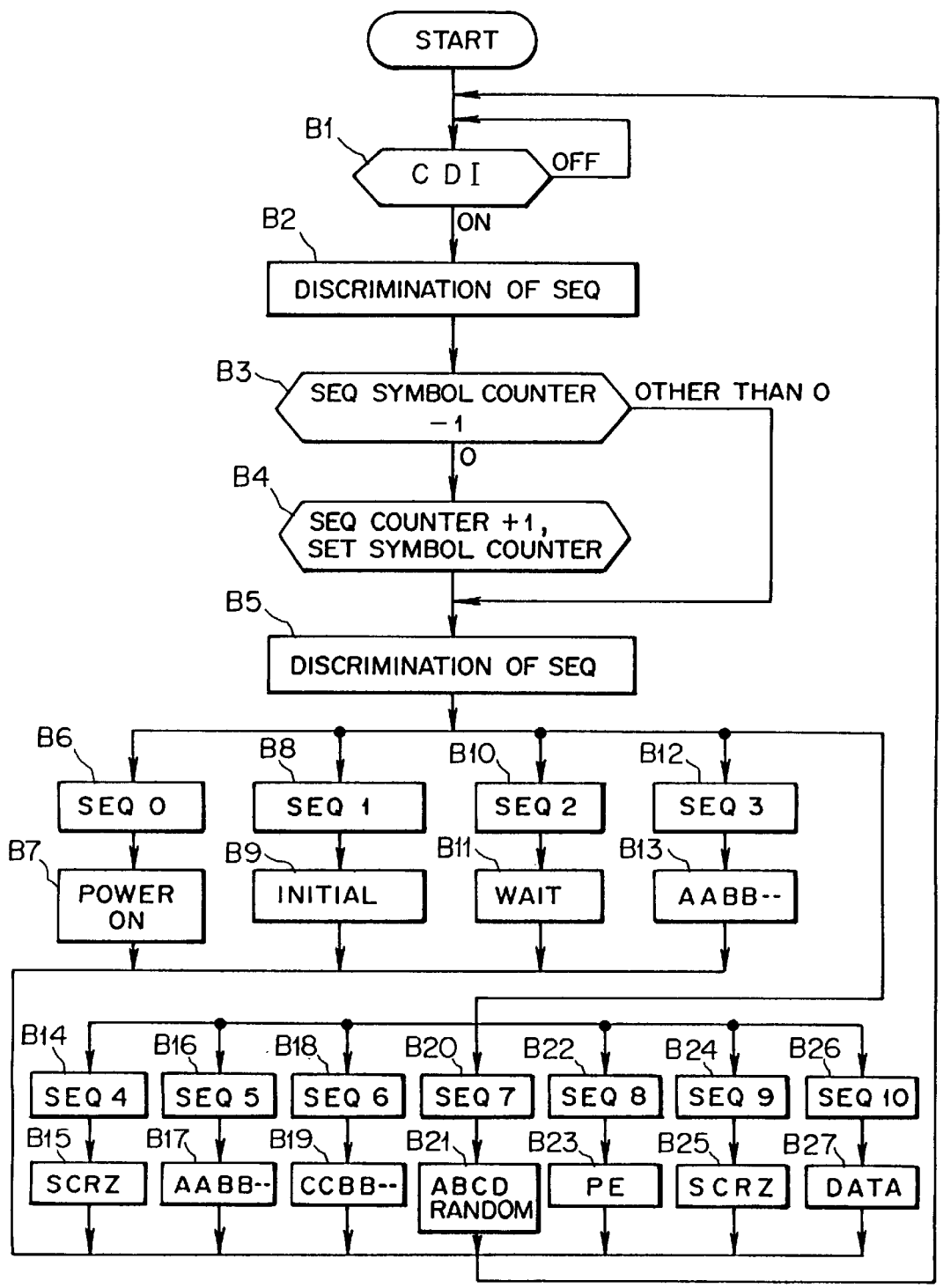
FIG. 9 is a flow chart illustrating operation of the modem shown in FIG. 4 on the reception side for training data.

Meanwhile, referring now to FIG. 9, the sequencer 90 on the reception side first discriminates at step B1 whether or not it is ready to receive data, and if the discrimination is in the affirmative, the sequencer 90 discriminates the sequence number at step B2. Then at step B3, "1" is subtracted from a value of a symbol counter in the sequencer 90 and it is discriminated whether or not a resulted difference value is equal to "0". If the resulted difference value is equal to "0", then "1" is added to the symbol counter value in the sequencer 90 and a resulted value is set to the symbol counter.

Thereafter, the sequencer 90 discriminates the sequence number at step B5. It is to be noted that, if it is discriminated at step B3 that the difference value is not equal to "0", then the control sequence advances directly to step B5 bypassing step B4.

Thereafter, the sequencer 90 recognizes processing on the transmission side based on the sequence number. In particular, when the sequence number is 0, it is recognized that the power is made available (steps B6 and B7); when the sequence number is 1, initialization is recognized (steps B8 and B9); when the sequence number is 2, entering into a waiting condition is recognized (steps B10 and B11); when the sequence number is 3, reception of the "AABB . . ." signals (signals of the first repeat signal portion 15a) is recognized (steps B12 and B13); when the sequence number is 4, reception of the SCRZ signals (signals of the first multi-value random signal portion 15b) is recognized (steps B14 and B15); when the sequence number is 5, reception of the "AABB . . ." signasl (signals of the second repeat signal portion 15c) is recognized (steps B16 and B17); when the sequence number is 6, reception of the "CCBB . . ." signals (signals of the third repeat signal portion 15d) is recognized (steps B18 and B19); when the sequence number is 7, reception of the ABCD random signals (signals of the second multi-value random signal portion 15e) is recognized (steps B20 and B21); when the sequence number is 8, reception of the pre-emphasis signals is recognized (steps B22 and B23); and when the sequence number is 9, reception of the SCRZ signals is recognized (steps B24 and B25). It is to be noted that, when the sequence number is 10, the sequencer 90 recognizes reception of the data (steps B26 and B27).

Then, on the reception side, signals for initialization are regenerated based on the training pattern, and initialization processing of the components of the reception side modem is performed using the signals.

In particular, as described hereinabove, upon reception of the "AABB . . ." signals (signals of the first repeat signal portion 15a), detection of a carrier, detection of training data, extraction of a timing frequency and initialization of the automatic gain control section 58 are performed. Further, upon reception of the first multi-value random signal portion 15b subsequent to the first repeat signal portion 15a, extraction of a timing phase is performed, and then upon reception of data of the second and third repeat signal portions 15c and 15d, sum calculation processing is performed by the impulse regeneration section 84 of the reception section 22 to regenerate an impulse, and initialization of the automatic equalization section 60 is performed using the thus regenerated impulse. Then, upon reception of the second multi-value random signal portion 15e, a flat spectrum is obtained and adjustment of the automatic equalization section 60 is performed using the flat spectrum.

It is to be noted that, upon such training, the lines indicated by alternate long and two short dashes lines in FIG. 4 of the secondary data transmission and reception systems are used.

Figure 16:
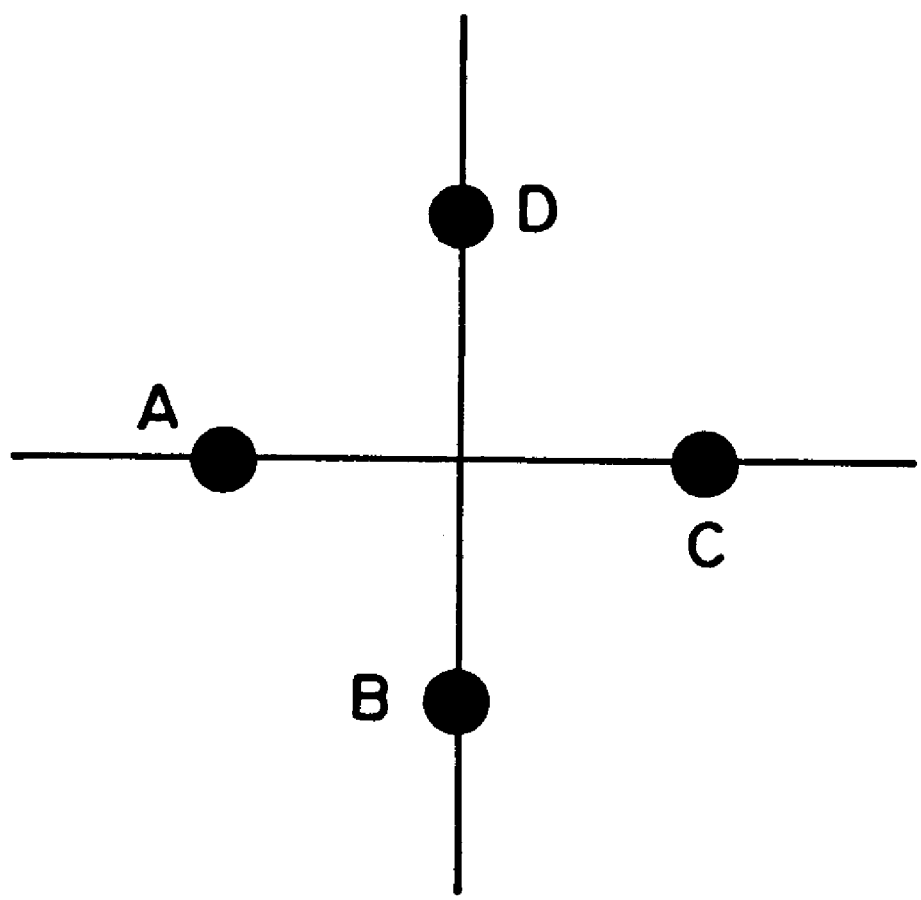
FIG. 16 is a diagram showing an arrangement of signal points.

In this manner, in the present embodiment, by using, as training data to be transmitted prior to transmission of data, not the ABAB pattern (refer to SEG2 in FIG. 16 and FIG. 11(a)), which is employed in the general Nyquist transmission system, but the AABB pattern (refer to SEG20 and FIG. 11(b)), detection of a carrier, detection of training data, extraction of a timing frequency and initialization of the automatic gain control section 58 upon non-Nyquist transmission are performed, and further by sending SCRZ signals (SEG21) subsequently to the AABB pattern (SEG20), extraction of a timing phase is performed. Further, by transmitting an impulse using the AABBCCBB pattern (SEG22 and SEG23) in place of transmission of an impulse using the ABABCBCB pattern (refer to SEG2 of FIG. 16) employed in the general Nyquist transmission system, initialization of the automatic equalization section 60 is performed, and finally, by using the ABCD random (refer to SEG30 and FIG. 13(*b*)) in place of the CD random (refer to SEG3 of FIG. 16 and FIG. 13(*a*)) employed in the general Nyquist transmission system, the convergence rate of the automatic equalization section 60 is accelerated to perform adjustment of the automatic equalization section 60.

Consequently, training upon non-Nyquist transmission can be realized. Accordingly, with the present embodiment, there is an advantage in that it becomes possible to extract a timing even with a model which employs a non-Nyquist transmission system, and high rate data transmission can be realized and the modem is improved very much in performance.

After initialization is performed in such a manner as described above, communication of data is performed.

In particular, in the transmission section 20, main channel data SDm are converted from serial data into parallel data by the serial to parallel converter 30, and the parallel data are scrambled by the scrambler 32A. Then, a sum calculation of the output of the scrambler 32A is performed by the sum calculation section 34A to produce relative difference data, and the relative difference data are processed so as to correct errors by the trellis-coded modulation section 36. Then, desired signal points are generated based on the output of the trellis-coded modulation section 36 by the signal point generation section 38A.

Meanwhile, also secondary data SDs are scrambled by the scrambler 32*b*, and a sum calculation of the output of the scrambler 32*b* is performed by the sum calculation section 34B to produce relative difference data. Then, desired signal points are generated based on the relative difference data by the signal point generation section 38A.

Thereafter, the two signals generated as described above are supplied by way of the frame rotation section 40 to the roll-off filter 42, by which filtering processing thereof is performed. A resulted signal from the roll-off filter 42 is modulated by the modulation section 44. Further, the modulated signal is equalized in terms of a delay, an amplitude component on a line and so forth by the fixed equalization section 46 and is then adjusted in level by the attenuator 48, whereafter it is converted from a digital signal into an analog signal by the digital to analog converter 28. The analog signal thus obtained is transmitted in accordance with a non-Nyquist transmission system by way of the line.

In the reception section 22, the received signal is converted from an analog signal into a digital signal by the analog to digital converter 29. The digital signal from the analog to digital converter 29 is equalized in terms of a delay, an amplitude component on a line and so forth by the fixed equalizer 52 and then demodulated by the demodulation section 54. The thus demodulated signal is filtered by the roll-off filter 56, and then, the loop gain thereof is adjusted by the automatic gain control section 58 so that the level of the demodulated signal may have a predetermined reference value to automatically adjust a reception level of a signal to be inputted to the automatic equalization section 60 at the following stage.

Then, equalization processing to correct a transmission distortion by the line and so forth is performed by the automatic equalization section 60, and then a carrier phase is corrected by the carrier phase correction section 62, whereafter pre-signal discrimination is performed by the hard decision section 64A and then by the soft decision section 64B. Thereafter, the signal points of the main data are discriminated by the signal point discrimination section 68A while the signal points of the secondary data are discriminated by the signal point discrimination section 68B.

Thereafter, the main data and the secondary data are separately processed by difference calculation processing and descrambling processing.

Consequently, stabilized very high rate data transmission can be realized without using a data compression function, and the modem is provided with an improved reliability.

It is to be noted that, according to the present invention, upon transmission of data in accordance with a non-Nyquist transmission system, the training data 15 at least having the first repeat signal portion 15*a* formed from a set of signals (AABB) which includes components of a lower rate than the Nyquist interval, that is, a set of signals (AABB) which have a lower rate than the Nyquist interval and whose signal points have phases different by 90 degrees from each other may be transmitted, prior to transmission of data, from the transmission section 20 and received by the reception section 22, in which initialization processing is performed using the thus received training data.

Further, upon transmission of data in accordance with a non-Nyquist transmission system, the training data 15 at least having the first repeat signal portion 15*a* formed from a set of signals (AABB . . .) which includes components of a lower rate than the Nyquist interval, that is, a set of signals (AABB . . .) which have a lower rate than the Nyquist interval and whose signal points have phases different by 90 degrees from each other and the first multi-value random signal portion 15*b* positioned subsequently to the first repeat signal portion 15*a* and formed from multi-value random signals (SCRZ) may be transmitted, prior to transmission of data, from the transmission section 20 and received by the reception section 22, in which initialization processing is performed using the thus received training data.

Furthermore, upon transmission of data in accordance with a non-Nyquist transmission system, the training data 15 at least having the second repeat signal portion 15*c* formed from a set of signals (AABB . . .) which includes components of a lower rate than the Nyquist interval, that is, a set of signals (AABB . . .) which have a lower rate than the Nyquist interval and whose signal points have phases different by 90 degrees from each other, and the third repeat signal portion 15*d* positioned subsequently to the second repeat signal portion 15*c* and formed from a set of signals (CCBB . . .) which includes components of a lower rate than the Nyquist interval and wherein the phase of the first signal point (C) is different by 180 degrees from that of the first signal (A) forming the second repeat signal portion 15*c*, that is, the third repeat signal portion 15*d* positioned subsequently to the second repeat signal portion 15*c* and formed from a set of signals (CCBB . . .) which are lower in rate than the Nyquist interval and wherein the phase of the first signal point (C) is different by 180 degrees from that of the first signal (A) forming the second repeat signal portion 15*c* and the phases of the signal points are different by 90 degrees from each other may be transmitted, prior to transmission of the data, from the transmission section 20 and received by the reception section 22, in which initialization processing is performed using the thus received training data.

Further, upon transmission of data in accordance with a non-Nyquist transmission system, the training data 15 at least having the second multi-value random signal portion 15*e* formed from multi-value random signals (ABCD random) may be transmitted, prior to transmission of the data, from the transmission section 20 and received by the reception section 22, in which initialization processing is performed using the thus received training data.

Further, the training method for a non-Nyquist transmission system and the training data transmission apparatus for a non-Nyquist transmission system according to the present invention can be applied for initialization of a reception section also in various other transmission apparatus than modems.

The present invention is not limited to the specifically described embodiment, and variations and modifications may be made without departing from the scope of the present invention.

What is claimed is:

1. A training method for a non-Nyquist transmission system, comprising the steps of:

transmitting from a transmission section, upon transmission of a set in accordance with the non-Nyquist transmission system, prior to transmission of the data set training data having a first repeat signal portion formed from a group of signals including components of a lower rate than a Nyquist interval; and receiving, by a reception section, the training data and performing initialization processing of said reception section using the received training data.

2. A training method for a non-Nyquist transmission system as claimed in claim 1, wherein the first repeat signal portion is formed from a group of signals which are lower in rate than the Nyquist interval and whose signal points are different by 90 degrees in phase from each other.

3. A training method for a non-Nyquist transmission system, comprising the steps of:

transmitting from a transmission section, upon transmission of a data set in accordance with the non-Nyquist transmission system, prior to transmission of the data set training data having a first repeat signal portion formed from a group of signals including components of a lower rate than a Nyquist interval and a first multi-value random signal portion positioned subsequently to the first repeat signal portion and formed from multi-value random signals; and receiving, by a reception section, the training data and performing initialization processing of said reception section using the received training data.

4. A training method for a non-Nyquist transmission system as claimed in claim 3, wherein the first repeat signal portion is formed from a group of signals which are lower in rate than the Nyquist interval and whose signal points are different by 90 degrees in phase from each other.

5. A training method for a non-Nyquist transmission system, comprising the steps of:

transmitting from a transmission section, upon transmission of a data set in accordance with the non-Nyquist transmission system, prior to transmission of the data, training data having a second repeat signal portion, wherein said second repeat signal portion is formed from signals which include components of a lower rate than a Nyquist interval, and a third repeat signal portion positioned subsequently to the second repeat signal portion, wherein said third repeat signal portion is formed from signals which include components lower in rate than the Nyquist interval, and wherein a first signal of said third repeat signal portion is different by 180 degrees in phase from a first signal of the second repeat signal portion; and receiving, by a reception section, the training data and performing initialization processing of said reception section using the received training data.

6. A training method for a non-Nyquist transmission system as claimed in claim 5, wherein the second repeat signal portion is formed from signals which are lower in rate than the Nyquist interval and whose signal points are different by 90 degrees in phase from each other, and the third repeat signal portion is positioned subsequently to the second repeat signal portion, and the third repeat signal portion is formed from signals which are lower in rate than the Nyquist interval, wherein a first signal point of said third repeat signal portion is different by 180 degrees in phase from a first signal of the second repeat signal portion, and wherein each phase of each signal of said third repeat signal portion is different by 90 degrees from each other.

7. A training method for a Non-Nyquist transmission system as claimed in claim 5, wherein the training data including the second repeat signal portion and the third repeat signal portion are received by said reception section, and sum calculation processing is performed for the received training data to regenerate an impulse to form a regenerated impulse and initialization processing of said reception section is performed using the regenerated impulse.

8. A training method for a Non-Nyquist transmission system as claimed in claim 6, wherein the training data including the second repeat signal portion and the third repeat signal portion are received by said reception section, and sum calculation processing is performed for the received training data to regenerate an impulse to form a regenerated impulse and initialization processing of said reception section is performed using the regenerated impulse.

9. A training method for a non-Nyquist transmission system, comprising the steps of:

transmitting from a transmission section, upon transmission of a data set in accordance with the non-Nyquist transmission system, prior to transmission of the data set, training data having a first repeat signal portion formed from signals including components of a lower rate than a Nyquist interval, a first multi-value random signal portion positioned subsequently to the first repeat signal portion and formed from multi-value random signals, a second repeat signal portion formed from signals including components of a lower rate than the Nyquist interval, a third repeat signal portion positioned subsequently to the second repeat signal portion and formed from signals which include components lower in rate than the Nyquist interval, wherein a first signal point of said third repeat signal portion is different by 180 degrees in phase from a first signal of the second repeat signal portion, wherein said training data also comprises a second multi-value random signal portion formed from multi-value random signals; and receiving, by a reception section, the training data and performing initialization processing of said reception section using the received training data.

10. A training method for a non-Nyquist transmission system as claimed in claim 9, wherein each of the first repeat signal portion and the second repeat signal portion comprises signals which are lower in rate than the Nyquist interval and whose signal points are different by 90 degrees in phase from each other, and the third repeat signal portion is positioned subsequently to the second repeat signal portion and comprises signals which are lower in rate than the Nyquist interval, and wherein the first signal point of said third repeat signal portion is different by 180 degrees in phase from the first signal of the second repeat signal portion and the phases of the signal points of said third repeat signal portion are different by 90 degrees from each other.

11. A training data transmission apparatus for a non-Nyquist transmission system for transmitting training data for initialization of a reception section in accordance with the non-Nyquist transmission system, comprising:

training data generation means for generating the training data; and control means for sending, prior to transmission of data, a control signal to said training data generation means to control said training data generation means to generate the training data having a first repeat signal portion formed from signals including components of a lower rate than a Nyquist interval, a first multi-value random signal portion positioned subsequently to the first repeat signal portion, wherein said first multi-value random signal portion is formed from multi-value random signals, a second repeat signal portion formed from signals including components of a lower rate than the Nyquist interval, a third repeat signal portion positioned subsequently to the second repeat signal portion, wherein said second repeat signal portion is formed from signals which include components lower in rate than the Nyquist interval, wherein a first signal point of said third repeat signal portion is different by 180 degrees in phase from a first signal of the second repeat signal portion, wherein said training data also comprises a second multi-value random signal portion formed from multi-value random signals.

12. A training data transmission apparatus for a non-Nyquist transmission system as claimed in claim 11, wherein each of the first repeat signal portion and the second repeat signal portion is formed from signals which are lower in rate than the Nyquist interval and whose signal points are different by 90 degrees in phase from each other, and the third repeat signal portion is positioned subsequently to the second repeat signal portion and formed from signals which are lower in rate than the Nyquist interval, and wherein the first signal point of said third repeat signal portion is different by 180 degrees in phase from the first signal of the second repeat signal portion and the phases of the signal points are different by 90 degrees from each other.

13. A training data transmission apparatus for a non-Nyquist transmission system as claimed in claim 12, wherein said training data generation means includes signal point generation means for generating four different signal points which are different by 90 degrees in phase from each other, and multi-value random signal generation means for generating multi-value random signals.

14. A training data transmission apparatus for a non-Nyquist transmission system as claimed in claim 13, wherein said control means controls said training data generation means so that signals forming the first repeat signal portion, the second repeat signal portion, the third repeat signal portion and the second multi-value random signal portion are generated by said signal point generation means, and wherein the first multi-value random signal portion is generated by said multi-value random signal generation means.

15. A training data transmission apparatus for a non-Nyquist transmission system as claimed in claim 12, wherein the random signals forming the second multi-value random signal portion are four-value random signals having one of four possible discrete phases, wherein each possible phase is 90 degrees from an adjacent phase.

16. A training data transmission apparatus for a non-Nyquist transmission system as claimed in claim 13, wherein the random signals forming the second multi-value random signal portion are four-value random signals having one of four possible discrete phases, wherein each possible phase is 90 degrees from an adjacent phase.

17. A training data transmission apparatus for a non-Nyquist transmission system as claimed in claim 14, wherein the random signals forming the second multi-value random signal portion are four-value random signals having one of four possible discrete phases, wherein each possible phase is 90 degrees from an adjacent phase.

* * * * *